United States Patent [19]

Gustafson

[11] Patent Number: 4,495,529
[45] Date of Patent: Jan. 22, 1985

[54] QUALIFIER CIRCUIT

[75] Inventor: Roy W. Gustafson, Boxborough, Mass.

[73] Assignee: Digital Equipment Corp., Maynard, Mass.

[21] Appl. No.: 375,933

[22] Filed: May 7, 1982

[51] Int. Cl.³ .......................... G11B 5/09; G11B 5/02
[52] U.S. Cl. ........................................ 360/46; 360/67
[58] Field of Search ................................. 360/46, 67

[56] References Cited

U.S. PATENT DOCUMENTS 3,846,829 11/1974 Lin ........................................ 360/46
4,346,411 8/1982 Buhler et al. ........................ 360/46
4,385,328 5/1983 Tanaka ................................ 360/46

*Primary Examiner*—Vincent P. Canney
*Attorney, Agent, or Firm*—Ronald Reiling; Albert Cefalo; Vincenzo Pitruzzella

[57] ABSTRACT

The present arrangement includes a circuit to receive non-differentiated pulse signals from the read circuitry of a magnetic recording medium system. These non-differentiated pulse signals are transmitted to a circuit which averages the values of the peaks of said signals, takes a predetermined percentage of that average value and produces a peak reference signal. The peak reference signal is transmitted to a comparison circuit whereat it is compared with the non-differentiated pulse signals and if the value of the peaks of the latter signals exceed the value of the peak reference signal, the comparison circuit will provide an output signal. The non-differentiated pulse signals are also transmitted to a differentiation circuit to effect a differentiation thereof and therefrom are transmitted to a zero crossover circuit. The zero crossover circuit provides a signal with a useful rising or falling edge, whose rising and falling edges occur at the zero crossovers of the differentiated signals. The output signal of the zero crossover circuit is applied to logic circuitry, which produces a qualified pulse when a rising edge of an output signal from the zero crossover circuit, occurs during the time that an output signal from the comparison circuit is present, which indicates that the pulse being considered, based on its peak value, is an intended pulse.

1 Claim, 2 Drawing Figures

QUALIFIER CIRCUIT

BACKGROUND

In the prior art, non-differentiated signals are taken from read head circuitry of a magnetic recording system to be reformed for use with a data handling device. The prior art systems operate to generate signals, whose rising or falling edges occur at the peaks of the non-differentiated pulse signals because the peaks of the non-differentiated signals most clearly define intended signals from noise signals. Heretofore, such non-differentiated signals were differentiated and the zero crossovers of the differentiated signals were detected to determine the time that the peak of the non-differentiated signals occurred. The problem with such systems is that, if the code employed has a relatively large k factor, i.e. a relatively large number of allowable encoded ZEROS between encoded ONES, then the output signal approaches the zero voltage value for a long period of time. If during this train of encoded ZEROS, noise occurs and/or perturbations occur on the zero voltage signal from the noise, then these perturbations could appear as intended signals because they would experience zero crossovers. The present arrangement eliminates the possibility of mistaking noise perturbations as intended signals.

SUMMARY

The present arrangement accepts non-differentiated pulse signals from a read circuit of a magnetic recording medium system. The non-differentiated signals follow two major paths. Along the first path, the non-differentiated signals are differentiated and, hence, the peaks of the non-differentiated signals occur at the zero crossover times of the differentiated signals. The differentiated signals are transmitted to a zero crossover comparator, which generates an output signal, having useful rising or falling edges. The last mentioned output signal has rising edges and falling edges at the same times as the zero crossovers of the differentiated signals. The second path that the non-differentiated signals follows is to a peak measuring device whereat the values of the peaks of the non-differentiated signals are averaged. A certain percentage of that average value is taken from the peak measuring circuit and is transmitted therefrom as a peak reference signal to a signal comparison circuit. In addition, the signal comparison circuit receives the raw non-differentiated pulses. In the signal comparison circuit, the non-differentiated pulses are compared with the peak reference signal and if they exceed that peak reference signal, then the comparison circuit provides an output signal which indicates that the pulse signal, which is under consideration, is an intended pulse signal as compared to a noise signal.

Logic circuitry, which responds to a rising edge, is connected to the comparison circuit and to the zero crossover comparison circuit so that if there is an output signal from the comparison circuit indicating that an intended pulse is present, the logic circuit will provide a qualified output signal in response to the rising edge coming from the zero crossover comparison circuit. In addition, the circuit includes a reset generator, which resets the logic circuit to determine the width of a qualified signal in order to keep the qualified signals uniform and which, by resetting the logic circuit, makes it responsive to the next signals from the comparison circuit and the zero crossover, as described above.

The features and objects of the present invention will be better understood in view of the following description taken in conjunction with the drawings wherein.

Figure 1:
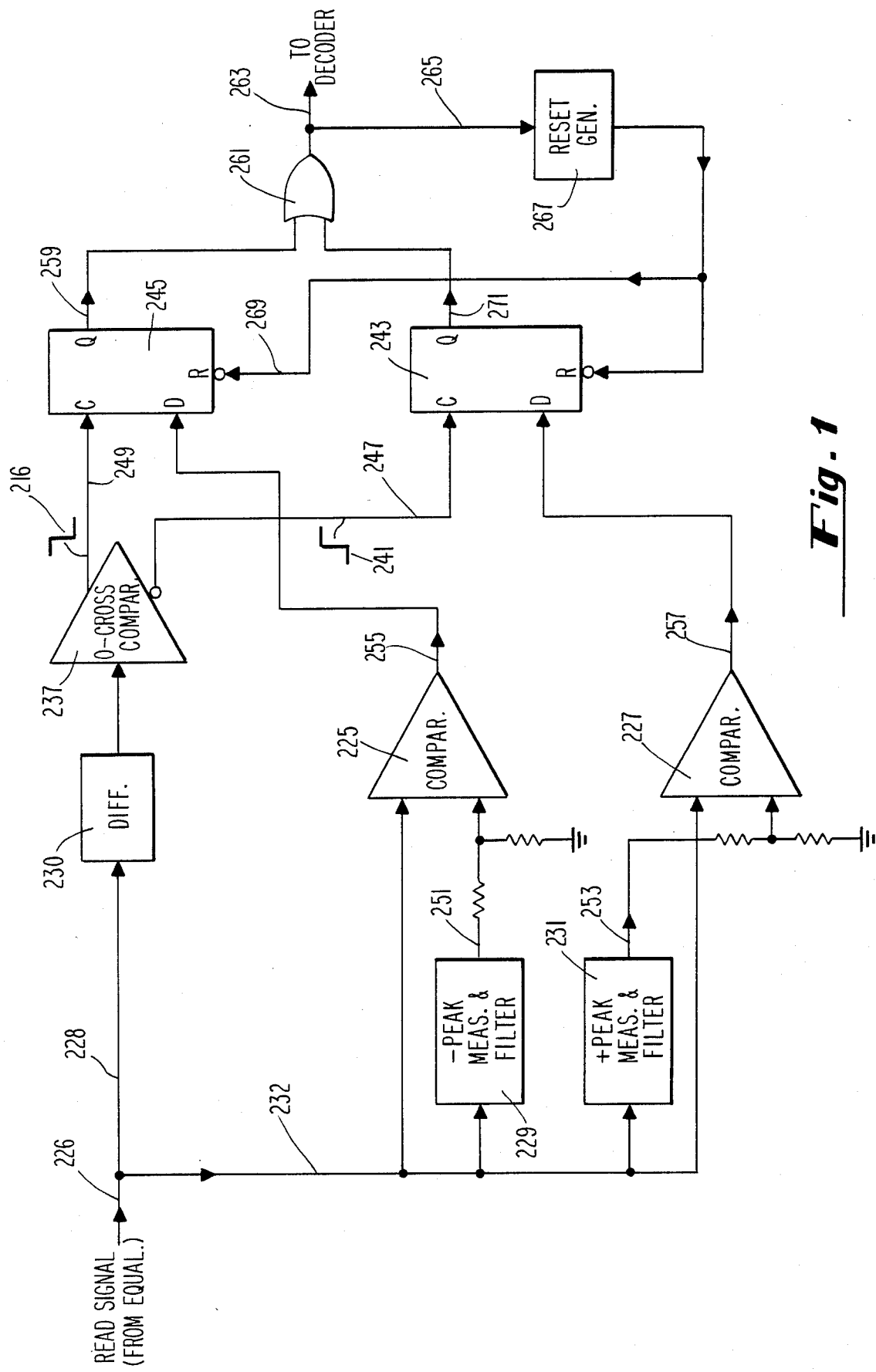
FIG. 1 is a block circuit diagram of the present circuitry.
Figure 2:
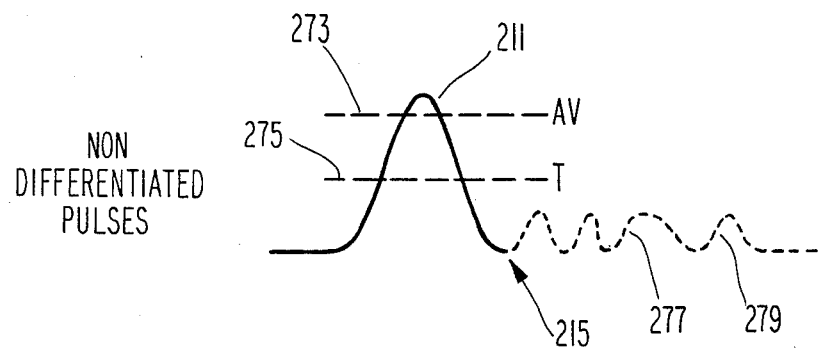
FIG. 2 shows some waveforms as they appear in the circuitry of FIG. 1.
Figure 2:
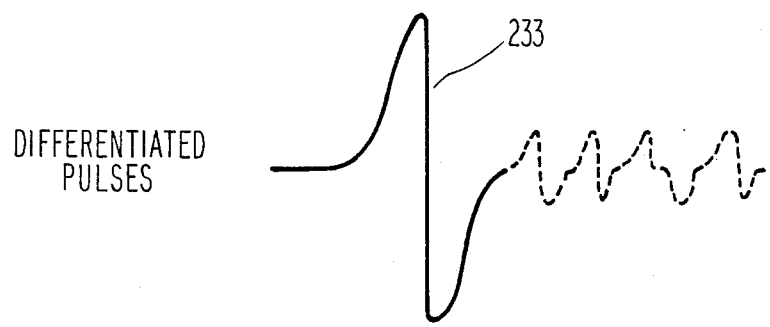
Figure 2:
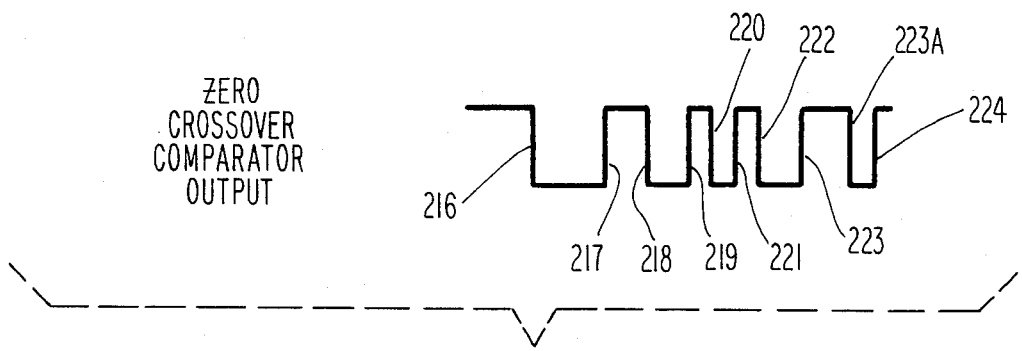

Consider FIG. 2, which shows some of the waveforms, which occur during an operation of the circuitry of FIG. 1. The top waveform, entitled "non-differentiated pulses", depicts the signals that occur when the flux on a magnetic recording medium, such as a disk, engages the winding of the read head. As a flux change is sensed by the read head, there is the positive pulse 211 generated. The waveform, shown as the "non-differentiated pulses," would be the waveform that would be generated in response to a single flux transition being present on a magnetic recording medium, such as a disk. If the coding arrangement called for encoded ZEROS, there would be no transition for the encoded ZEROS and the voltage level would tend to assume a zero voltage level indicated by the arrow 215.

It has been the practice in the prior art to differentiate a pulse, such as pulse 211, to detect the zero crossover time of the differentiated signal. The system has been designed to recognize that, at zero crossover times, the peaks of the pulses have been generated. The waveform, entitled "differentiated pulses", depicts a waveform wherein the pulse 211 has been differentiated by a differentiation circuit. The zero crossover comparator output waveform shows "digital" level signals generated in response to the differentiated signals. The time of the zero crossovers of the differentiated signals, are depicted as the rising or falling edges, identified as 216 through 224 and includes zero crossovers of noise signals as will be understood from the description hereinafter.

To the right of the pulse 211 in the waveform, entitled "non-differentiated pulses", there is shown a dashed line pulse waveform and this is to indicate that if there were noise occurring during the presence of encoded ZEROS between encoded ONES, the perturbations, created by the noise, when differentiated, might appear as zero crossover signals and, thereby, could indicate to the system that there were acceptable pulses present. The present system circuitry is directed to eliminating the mistaken notion from a circuitry standpoint that zero crossovers generated by spurious signals are, in fact, zero crossovers generated by intended signals.

If the circuitry of FIG. 1 is examined, it can be seen that there is input circuitry, identified as line 226, to which the signals, shown in FIG. 2 as the non-differentiated pulses, are transmitted. The non-differentiated pulses follow two major paths, one of the paths being along line 228 to the differentiator circuit 230 and the other major path being along line 232 to the comparison circuits 225 and 227. The non-differentiated signals are also transmitted to the peak measuring circuits 229 and 231. In the differentiation circuit 230, the non-differentiated pulses, such as pulse 211, are differentiated into pulse signals similar to the differentiated pulse signal 233, in FIG. 2. The differentiation circuit 230 is well known in the art and, in the preferred embodiment, the differentiation circuit 230 can be of the kind used in an MC3470, manufactured by Motorola Corporation. The differentiated signals, such as signal 233, are transmitted from the differentiator 230 to a zero crossover comparator 237, shown in FIG. 1.

At the zero crossover comparator 237, the differentiated signals are transformed into signals having rising or falling edges, whose rising edges or falling edges occur at zero crossover times. Such output signals are shown by the signals 216 through 224. It should be noted that when the signal 216 (in FIG. 1) has a falling edge, the signal 241 has a rising edge because the signal 241 is an inversion of the signal 216. The zero crossover comparator, in the preferred embodiment, is an MC1711, manufactured by Motorola Corporation, but it should be understood that any suitable zero crossover comparator might be used.

As can be seen in FIG. 1, there are two D-type flops 243 and 245 connected to the zero crossover comparator 237. The D-type flops 243 and 245 respond to rising edge signals. Hence, the D flop 243 will respond to a positive going edge signal on line 247, while the D flop 245 will respond to a positive going edge signal on line 249, when each of those D flops has a positive signal present at its D terminal.

If we consider now the second major path followed by the non-differentiated signals, we find that when they are transmitted to the peak measuring circuits 229 and 231, the pulses have their peak values averaged therein. These average values are respectively transmitted on the lines 251 and 253. The signals on lines 251 and 253 are transmitted through associated resistor networks, wherein a percentage of the average value is taken to provide a peak reference signal to the comparison devices 225 and 227. In the preferred embodiment, the resistors are chosen so that the peak reference value is approximately one-half of the average value of the peak signals found at the output of the peak measuring devices.

Further, as can be seen in FIG. 1, the non-differentiated pulses are transmitted directly to the comparison circuits 225 and 227, whereat they are compared with the peak reference signal. If the peak values of the non-differentiated pulses exceed the peak reference value, then there will be output signals respectively on the lines 255 and 257. The reason that there are two comparator circuits 225 and 227 and two peak measuring circuits 229 and 231 is that the peak measuring circuit 229 and the comparator 225 operate with positive going pulses, such as pulse 211, while the peak measuring circuit 231 and the comparator 227 operate with negative going pulses. It should also be understood that if a full wave rectifier were inserted in the line 232, the signals coming therefrom would be of one polarity and, hence, only one peak measuring circuit and one comparator would be needed.

Assume that the D flop 245 has been reset, as will become apparent hereinafter. The output signal from the comparator 225 is transmitted on the line 255 to the D terminal of the D flop 245. When there is a positive signal present at the D terminal of the D flop 245, and a positive going signal occurs on the line 249, then the Q terminal of the D flop 245 will go high providing a high output signal on line 259. The high output signal on line 259 will be transmitted to the OR Gate 261 and, therefrom, on line 263 to the decoder. The output signal from the Q terminal of the D flop 245 will remain high until the D flop 245 is reset and, accordingly, the width of the pulse to the decoder will depend upon how long the D flop 245 remains set. The output signal from the OR Gate 261 is transmitted on the line 265 to the reset generator 267. The reset generator 267 is a monostable flip-flop, or other delay circuit, which provides an output signal after a certain period of time to cause a reset signal on line 269 to reset the D flop 245. When the D flop 245 is reset, the value of the signal at the Q terminal goes negative and, hence, the width of the output signal to the decoder has been determined.

In a like manner, when there is an output signal from the comparator 227 on line 257 indicating that the peak of a negative non-differentiated pulse exceeds the peak reference signal, there will be a positive signal applied to the D terminal of the flop 243. If there is a positive signal applied to the D terminal and a rising edge signal applied on line 247, the D flop 243 will be transferred and there will be a positive signal at the Q terminal of the D flop 243. The output signal from the Q terminal of the D flop 243 will provide a positive signal on the line 271, which will be transmitted through the OR Gate 261, along the line 263, to the decoder. In the same way that was described in connection with controlling the width of the pulses on line 259, the width of the pulses on 271 are determined by the output of the reset generator 267.

If the average value of the peaks of the non-differentiated positive signals were determined to be 1.8 volts, as shown by the average line 273 in FIG. 2, and the resistor network took a one-half value thereof, there would be provided a peak reference signal or a threshold value of 0.9 volts, such as shown by the threshold line 275. Under such parameters, if the noise perturbation, shown by the pulses 277 and 279, did not exceed the threshold value of 0.9 volts, those perturbation signals would not have sufficient peak value to cause the system to view the zero crossovers, as depicted by the rising and falling edges 217 through 224, as being zero crossovers of intended pulses.

The present qualifier is particularly useful in a system wherein the encoding arrangement accomodates a large number of encoded ZEROS (wherein an encoded ZERO is a nontransition of flux) between flux transitions or encoded ONES.

I claim:

1. Qualifier circuitry means for determining whether or not a signal generated by a read head associated with a magnetic recording medium is a qualified signal as compared with noise and the like comprising in combination: input circuitry means formed to receive non-differentiated pulse signals from said read head; first and second peak measuring circuitry connected to said input circuitry means and each formed to detect and average peak values of said non-differentiated signals received by said input circuitry means and each further formed to generate a different peak reference signal; first and second signal comparison means connected to said input circuitry means to receive said non-differentiated pulse signals and further respectively connected to said first and second peaks measuring circuitry to receive respectively therefrom said peak reference signals and each of said signal comparison means formed to generate a valid signal when the amplitude peak of a non differentiated signal exceeds the amplitude of a said reference signal with which it is compared; signal differentiation circuitry connected to said input circuitry means to differentiate said non-differentiated pulse signals and provide differentiated signals therefrom; zero crossover circuitry coupled to said differentiation circuitry to receive said differentiated signals and formed to generate a leading edge signal virtually coincident with associated zero crossover of said differentiated signals; first logic circuit means having at least first and second input signal means and an output signal means and connected to said zero crossover circuitry and some first signal comparison means and formed to provide a first qualified signal in response to the simultaneous presence of a leading edge signal and a valid signal respectively at said last mentioned first and second input signal means; and second logic circuit means having at least first and second input signal means and an output signal means and formed to provide a second qualified signal in response to the simultaneous presence of a leading edge signal and a valid signal respectively at said last mentioned first and second input signal means.

* * * * *